United States Patent
Milward et al.

(10) Patent No.: US 9,031,926 B2
(45) Date of Patent: May 12, 2015

(54) EXTRACTING AND DISPLAYING COMPACT AND SORTED RESULTS FROM QUERIES OVER UNSTRUCTURED OR SEMI-STRUCTURED TEXT

(75) Inventors: David R. Milward, Cambridge (GB);
James R. Thomas, Cambridge (GB);
Sylvia F. Knight, Cambridge (GB);
Roger W. Hale, Cambridge (GB)

(73) Assignee: Linguamatics Ltd., Cambridge (GB)

( * ) Notice: Subject to any disclaimer, the term of this patent is extended or adjusted under 35 U.S.C. 154(b) by 442 days.

(21) Appl. No.: 13/414,372

(22) Filed: Mar. 7, 2012

(65) Prior Publication Data

US 2012/0166426 A1 Jun. 28, 2012

Related U.S. Application Data

(63) Continuation of application No. 12/133,205, filed on Jun. 4, 2008.

(60) Provisional application No. 60/941,944, filed on Jun. 4, 2007, provisional application No. 60/980,758, filed on Oct. 17, 2007.

(51) Int. Cl.
*G06F 17/30* (2006.01)
*G06F 17/27* (2006.01)

(52) U.S. Cl.
CPC ........ *G06F 17/30613* (2013.01); *G06F 17/277* (2013.01); *G06F 17/30684* (2013.01); *G06F 17/30908* (2013.01)

(58) Field of Classification Search
CPC .... G06F 17/30861; G06F 17/20; G06F 17/21
USPC .......... 707/706, 707, 708, 737, 736
See application file for complete search history.

(56) References Cited

U.S. PATENT DOCUMENTS

| | | | | |
|---|---|---|---|---|
| 5,774,652 A * | 6/1998 | Smith | | 726/20 |
| 6,034,697 A * | 3/2000 | Becker | | 345/606 |
| 6,178,430 B1 * | 1/2001 | Cohen et al. | | 715/273 |
| 6,578,078 B1 * | 6/2003 | Smith et al. | | 709/224 |
| 6,611,846 B1 * | 8/2003 | Stoodley | | 707/740 |
| 6,694,321 B1 * | 2/2004 | Berno | | 1/1 |
| 6,886,010 B2 * | 4/2005 | Kostoff | | 1/1 |
| 6,993,533 B1 * | 1/2006 | Barnes | | 1/1 |
| 7,311,600 B2 * | 12/2007 | Sundstrom | | 463/17 |
| 7,392,303 B2 * | 6/2008 | Smith et al. | | 709/223 |
| 7,574,652 B2 | 8/2009 | Lennon et al. | | |
| 7,844,696 B2 * | 11/2010 | Labovitz et al. | | 709/224 |
| 2002/0116213 A1 * | 8/2002 | Kavounis et al. | | 705/1 |
| 2002/0120616 A1 * | 8/2002 | Yun et al. | | 707/3 |
| 2004/0015783 A1 | 1/2004 | Lennon et al. | | |
| 2004/0024848 A1 | 2/2004 | Smith et al. | | |
| 2004/0078236 A1 * | 4/2004 | Stoodley et al. | | 705/2 |
| 2004/0181543 A1 * | 9/2004 | Wu et al. | | 707/102 |
| 2006/0230100 A1 * | 10/2006 | Shin et al. | | 709/203 |
| 2007/0282598 A1 | 12/2007 | Waelti et al. | | |
| 2008/0177994 A1 * | 7/2008 | Mayer | | 713/2 |
| 2008/0215313 A1 | 9/2008 | Waelti et al. | | |
| 2008/0301129 A1 | 12/2008 | Milward et al. | | |

* cited by examiner

*Primary Examiner* — Baoquoc N To
(74) *Attorney, Agent, or Firm* — Perkins Coie LLP

(57) ABSTRACT

A system for indexing unstructured or semi-structured data is disclosed. The system may identify regions within the data, such as "Abstract" or "References". The system may identify linguistic units such as sentences, noun groups, verb groups. The system may also identify concepts such as companies, people, diseases, amounts, and so forth. The query results may be formatted so that similar results from different documents, or from the same document, are clustered together.

42 Claims, 10 Drawing Sheets

| study type | f | Evidence | | |
|---|---|---|---|---|
| follow-up | 142 | 16517548 | ▲3 | ...Malmo mammographic screening trial: [follow-up study]; |
| randomized | 140 | 16401272 | ▲6 | ...of asymptomatic duration from a [randomized] prospective cancer screening trial. |
| clinical | 115 | 16488339 | ▲4 | During efalizumab [clinical trials], a small percentage of ... |
| case-control | 84 | 16432461 | ▲4 | ... cutaneous malignant melanoma: a [case-control] study from Italy. |
| cohort | 76 | 16622123 | ▲4 | ... International BRCA1/2 Carrier [Cohort Study] (IBCCS). |
| double-blind | 49 | 16635659 | ▲4 | A randomized, [double-blind], placebo-controlled trial of photopheresis ... |
| cross-sectional | 33 | 16415384 | ▲3 | [Cross-sectional study] of bisphosphonate use in dermatology ... |
| placebo | 26 | 16635659 | ▲3 | A randomized, double-blind, [placebo-controlled] trial of photopheresis in systemic ... |
| population | 11 | 16457150 | ▲2 | A [population-based study] |
| single-blind | 9 | 16397520 | ▲2 | We performed a prospective, [single-blinded] study to explore the reliability ... |
| crossover | 8 | 16509835 | ▲3 | ..., double-blind, placebo-controlled, [crossover study] of sertraline (Zoloft) ... |
| observational | 7 | 16546588 | ▲1 | METHODS: This is an [observational study] in which all confirmed cases ... |
| experimental | 5 | 16565366 | ▲1 | [Experimental study] of the survival of metastatic ... |
| non-blind | 3 | 16510347 | ▲1 | ... to reduce the blinding and [non-blinding] burden of trachoma. |

*FIG. 3A*

| study type | f | | Evidence | |
|---|---|---|---|---|
| follow-up | 142 | ▲ | 16517548 | ▲ 3 ... Malmo mammographic screening trial: follow-up study. |
| randomized | 140 | ▲ | 16401272 | ▲ 6 ... of asymptomatic duration from a randomized prospective cancer screening trial. |
| clinical | 115 | ▲ | 16488339 | ▲ 4 During efalizumab clinical trials, a small percentage of ... |
| case-control | 84 | ▲ | 16432461 | ▲ 4 ... cutaneous malignant melanoma: a case-control study from Italy. |
| cohort | 76 | ▲ | 16622123 | ▲ 4 ... International BRCA1/2 Carrier Cohort Study (IBCCS). |
| double-blind | 49 | ▲ | 16635659 | ▲ 4 A randomized, double-blind, placebo-controlled trial of photopheresis ... |
| cross-sectional | 33 | ▲ | 16415384 | ▲ 3 Cross-sectional study of bisphosphonate use in dermatology ... |
| placebo | 26 | ▲ | 16635659 | ▲ 3 A randomized, double-blind, placebo-controlled trial of photopheresis in systemic ... |
| population | 11 | ▲ | 16457150 | ▲ 2 A population-based study. |
| single-blind | 9 | ▼ | 16397520 | ▼ 2 We performed a prospective, single-blinded study to explore the reliability ... |
| | | | | Single-Blind Method |
| | | | 16433205 | 1 Single-Blind Method |
| | | | 16540070 | 1 Single-Blind Method |
| | | | 16405483 | 1 Single-Blind Method |
| | | | 16550661 | 1 Single-Blind Method |
| | | | 16414395 | 1 Single-Blind Method |
| | | | 16394436 | 1 METHODS: A randomized single-blind clinical comparative study was undertaken ... |
| | | | 16334049 | 1 Single-Blind Method |
| | | | 16356661 | 1 Single-Blind Method |
| crossover | 8 | ▲ | 16509835 | ▲ 3 ..., double-blind, placebo-controlled, crossover study of sertraline (Zoloft) ... |
| observational | 7 | ▲ | 16546588 | 1 METHODS: This is an observational study in which all confirmed cases ... |
| experimental | 5 | ▲ | 16565366 | 1 Experimental study of the survival of metastatic ... |
| non-blind | 3 | ▲ | 16510347 | 1 ... to reduce the blinding and non-blinding burden of trachoma. |

FIG. 3B

| | | | |
|---|---|---|---|
| Prednisolone | 100 mg/day | 1 | 16202017 | ▲ However, the patient relapsed twice despite two sessions of steroid pulse therapy and<br>2 an increase in the dose of [prednisolone] to [100 mg/day]. |
| | 0.75 mg/kg/day | 1 | 16034874 | 1 AUTHORS' CONCLUSIONS: Very potent topical steroids are effective and safe treatments for bullous pemphigoid; their use in extensive disease may be limited by side effects and practical factors. Starting doses of [prednisolone] greater than [0.75 mg/kg/day] do not seem to give additional benefit, lower doses may be adequate for disease control; this could reduce the incidence and severity of adverse reactions. The effectiveness of the addition of plasma exchange or azathioprine to corticosteroids has not been established. Combination treatment with tetracycline and nicotinamide may be useful; this needs further validation. |
| | 30 mg/day | 1 | 15863867 | 1 In 2002, necrotic ulcers appeared on his right leg that were refractory to [oral prednisolone] ([30 mg/day]). |
| | 40 mg/day | 1 | 15811084 | 1 Under systemic treatment with [prednisolone], [40 mg/day], the skin healed completely within 2 weeks. |
| | 60 mg/day | 1 | 16467600 | 1 Methylprednisolone pulse therapy was initiated followed by [prednisolone] ([60 mg/day]) and cyclosporin A (150 mg/day). |
| Pimecrolimus | 30 mg/kg/day | 1 | 15093258 | ▲ In KLH-immunised rats, CsA caused complete suppression of the KLH-specific IgM and<br>3 IgG production, whereas only IgG production was affected by [pimecrolimus] at [30 mg/kg/day] and more so by tacrolimus at 3 mg/kg/day. |
| | 10 mg/kg/day | 1 | 15093258 | ▲ Immunophenotyping of lymphocyte sub-populations in spleen and lymph node indicated a<br>2 decrease in T lymphocytes with pimecrolimus at 30 mg/kg/day, tacrolimus and CsA, whereas these changes were marginal for [pimecrolimus] at [10 mg/kg/day]. |
| Tacrolimus | 3 mg/kg/day | 1 | 15093258 | ▲ Male rats (10 per group) were orally administered pimecrolimus at 10 or 30 mg/kg/day,<br>3 [tacrolimus] at [3 mg/kg/day] or CsA at 20 mg/kg/day for 4 weeks. |
| | 0.1 mg/kg/day | 1 | 11907845 | 1 OBJECTIVE: In psoriasis, a placebo-controlled double-blind study has shown [oral tacrolimus] at [0.1 mg/kg/day] to be effective in controlling recalcitrant lesions. |

*FIG. 4*

| Cyclosporine | Compound-Gene | Entrez Genes | Gene-Disease | Psoriasis | | Doc | | Hit | | Doc | | Hit |
|---|---|---|---|---|---|---|---|---|---|---|---|---|
| Cyclosporine | inhibit | Interferon | affect | Psoriasis | 1 | 1789988 | 1 | In addition, ciclosporin blocked the interferon-gamma-induced increase in epidermal 12(S)-HETE binding. | ▲9 | 9856816 | 1 | ...helper 1-type cytokines such as interferon-gamma in psoriasis. |
| Cyclosporine | inhibit | IL8 | affect | Psoriasis | ▲2 | 9588080 | 1 | It was found out that CsA inhibits IL-8 production by stimulated THP-1 monocyte cell... | ▲8 | 11378328 | ▲2 | Interleukin-8-positive neutrophils in psoriasis. |
| Cyclosporine | affect | CALM3 | affect | Psoriasis | 1 | 2277142 | 1 | Cyclosporine binds to calmodulin with low affinity, and ... | ▲7 | 1879987 | 1 | Epidermal calmodulin levels in psoriasis before & after therapy. |
| Cyclosporine | inhibit | Growth factor | affect | Psoriasis | ▲2 | 8884530 | 1 | FK506 and cyclosporin A inhibit growth factor-stimulated human keratinocyte proliferation by blocking cells in the ... | ▲6 | 14962110 | 1 | Single-nucleotide polymor-phisms of vascular endothelial growth factor in psoriasis of early onset. |

*FIG. 5*

| Patent Number | Inventor | Publication Date | Amount | Pharmacologic Substa.. | Sentence |
|---|---|---|---|---|---|
| Patent Number EP0065123 | Inventor WAHLIG HELMUT DR; DINGELDEIN ELVIRA DR; KIRCHLECHNER RICHARD DR; ORTH DIETER DR; ROGALSKIWERNER DR | Publication Date 1982-11-24 | Amount 2 moles | Gentamicin gentamycin | In the case of the gentamycin hesperidinphosphates, for example, the salt (mixture) of 2 moles of gentamycin and 5 moles of hesperidin-phosphoric acid is particularly preferred. |
| Patent Number EP0065123 | Inventor WAHLIG HELMUT DR; DINGELDEIN ELVIRA DR; KIRCHLECHNER RICHARD DR; ORTH DIETER DR; ROGALSKIWERNER DR | Publication Date 1982-11-24 | Amount 10 mmols | Gentamicin gentamycin sulfate | A solution of 20.4 g (25 mmols) of disodium hesperidin-5,3'-disphosphate in 600 ml of water is added to a solution of 7.07 g (10 mmols) of gentamycin sulfate in 200 ml of water at 20 DEG, while stirring. |
| Patent Number EP0065123 | Inventor WAHLIG HELMUT DR; DINGELDEIN ELVIRA DR; KIRCHLECHNER RICHARD DR; ORTH DIETER DR; | Publication Date 1982-11-24 | Amount 10 kg | Neomycin neomycin hesperidin-phosphate | 10 kg of neomycin hesperidin-phosphate is introduced into hard gelatin capsules in conventional fashion, so that each capsule contains active compound corresponding to 165 mg of neomycin base. |

*FIG. 7*

ID SECTIONS:

EXTRACTING AND DISPLAYING COMPACT AND SORTED RESULTS FROM QUERIES OVER UNSTRUCTURED OR SEMI-STRUCTURED TEXT

CROSS REFERENCE TO RELATED APPLICATION

This application is a continuation of U.S. patent application Ser. No. 12/133,205 entitled "EXTRACTING AND DISPLAYING COMPACT AND SORTED RESULTS FROM QUERIES OVER UNSTRUCTURED OR SEMI-STRUCTURED TEXT," filed on Jun. 4, 2008, which claims priority to U.S. Provisional Patent Application No. 60/941,944 entitled "USE OF REGIONS TO PROVIDE RESPONSES TO QUERIES," filed on Jun. 4, 2007, and U.S. Provisional Patent Application No. 60/980,758 entitled "EXTRACTING AND DISPLAYING COMPACT AND SORTED RESULTS DIRECTLY FROM QUERIES OVER UNSTRUCTURED TEXT," filed on Oct. 17, 2007, each of which is hereby incorporated by reference.

BACKGROUND

Large organizations such as pharmaceutical companies and healthcare organizations have a massive amount of information available to them. This may include, for example, ongoing and historical clinical trials and studies, treatment guidelines, patient information, patents, research documents, external research literature, news articles, as well as information on the web. Most of this information is in the form of unstructured or semi-structured text (e.g. XML). The vast quantities make it hard to read, even with the help of a search engine to prune down the number of relevant documents.

Conventional systems do not provide results directly from the structured or unstructured text in a format that can be used directly for decision making. Search engines do not provide any structure, other than the structure in the original document. Information extraction systems do not use an index, so cannot provide fast interactive querying, nor do they allow a flexible mix of constraints based on linguistic constructions and the structure of the document.

BRIEF DESCRIPTION OF THE DRAWINGS

FIGS. 3A and 3B illustrate controls that enable a user to examine the evidence of a query result.

FIG. 4 illustrates the grouping of one or more key columns that are associated with a user-preferred concept in a query result.

FIG. 5 illustrates the joining of two queries in a query result.

FIG. 7 illustrates a query over a combination of structured and semi-structured data.

DETAILED DESCRIPTION

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid obscuring the description of the various embodiments.

Figure 1:
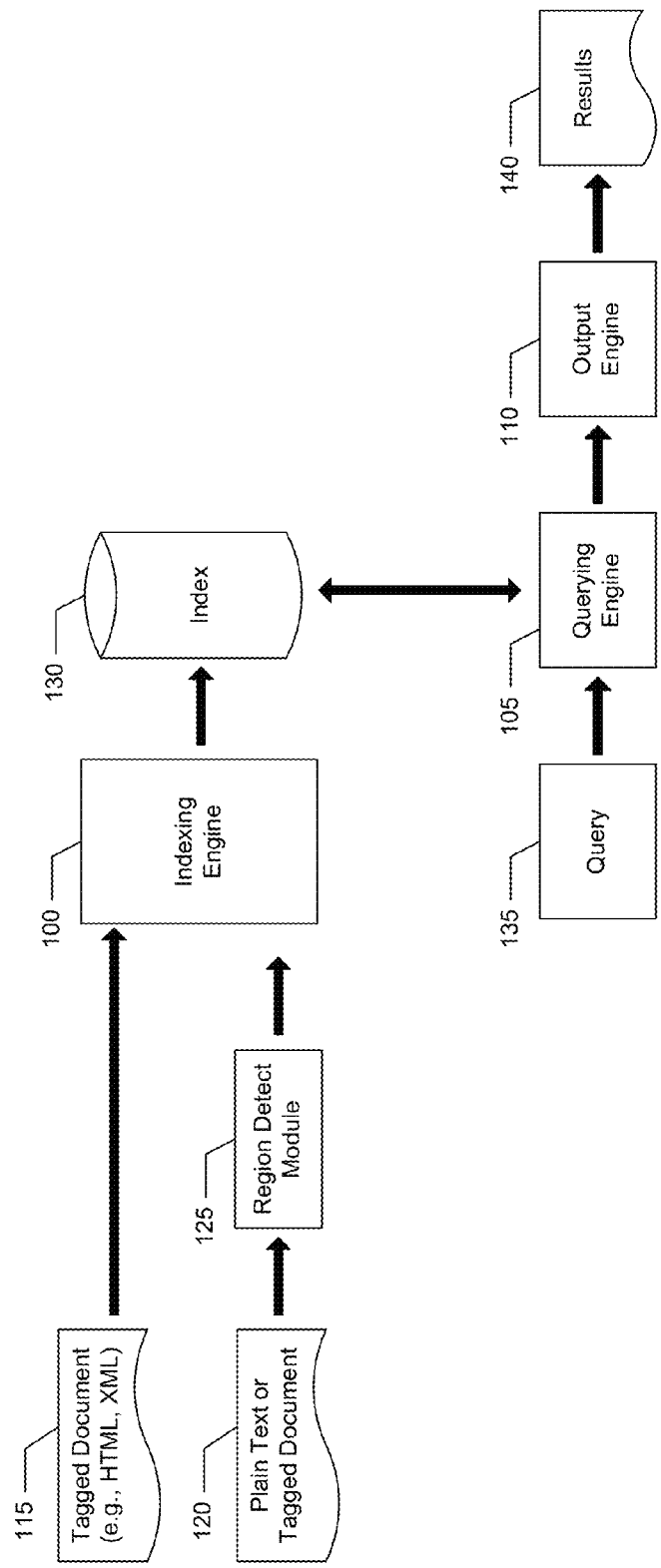
FIG. 1 is a high-level data flow diagram showing data flow within an arrangement of components used to index and query semi-structured and unstructured data.

FIG. 1 is a high-level data flow diagram showing data flow within an arrangement of components used to index and query semi-structured and unstructured data. The system comprises an indexing engine 100, a querying engine 105, and an output engine 110. The indexing engine analyzes semi-structured documents 115 and unstructured documents 120 (collectively, "source documents") and creates an efficient representation of the content of each source document. Semi-structured information includes both free text and some degree of structure. The indexing engine may also analyze other types of documents not mentioned here. In some embodiments, the indexing engine identifies a number of regions within a source document. A region is part of the text, which is either a structural unit (such as, e.g., the Abstract) or a meta-data field (such as, e.g., a publication date). For example, identified regions may include an Abstract, Acknowledgements, Authors, Body, Figures, Figure Text, Paragraphs, Tables, Table Row, References, Keywords, Title, etc. Regions may be nested within the source documents, i.e., regions may fall inside each other. For example, the title of a work that is contained within an appendix is a nested region.

When a document is semi-structured, the region boundaries may be determined by identifying tags within the source documents and associating the tags with particular types of regions. For some semi-structured documents, however, the structuring provided is not sufficient to identify the relevant regions. In these cases, a Region Detect module 125 may be used to elaborate the original structure. This may involve meta-tagging a document with fields and values, partitioning text of the document into sections, or marking-up of the entire document (such as, e.g., XML or HTML).

When a document is unstructured (e.g., plain text), the Region Detect module 125 analyzes the document to determine the regions of the document. In some embodiments, a Region Detect module 125 analyzes unstructured documents one line at a time using a set of rules to determine the probability that a line is part of a particular region or is a region itself. This determination may be based on the form of the line and the form of the lines immediately preceding and following the analyzed line. For example, when the line is in all capital letters the Region Detect module may determine that the line is a title or a section heading. The region detect module can be customized so that documents using non-standard conventions can be indexed. After identifying the potential region boundaries, the Region Detect module generates a semi-structured document (e.g., an XML document) having tags that are associated with identified region boundaries.

The indexing engine 100 encodes the type of each region and the text of the source document in an index 130 designed for efficient querying. In some embodiments, the indexing engine uses a configuration file to map tags within source documents, for example, to regions of particular types or to other concepts of interest. The indexing engine uses an opening tag to identify the start of a region and its type (e.g., paragraph, section, etc.). It stores region start position and type, adding the end position when the matching closing tag is found. Positions may be stored according to sentence number and word number within a sentence. Positions may also be stored in other fashions, such as character position within the document.

Figure 2:
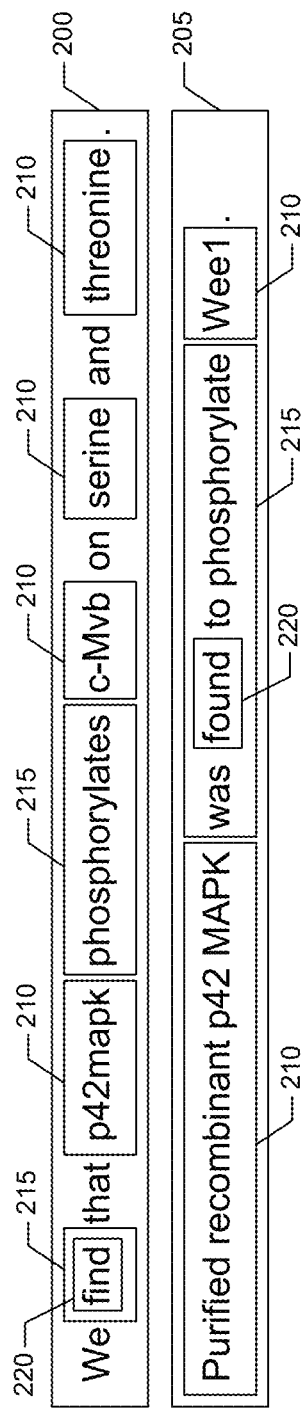
FIG. 2 illustrates an example of how an indexing engine identifies meaningful linguistic units.

The indexing engine 100 analyzes text according to linguistic structure. In this embodiment, the indexing engine processes each source document word by word and stores the start and end position of linguistic units, including sentences, noun groups, verb groups, etc. FIG. 2 illustrates an example of how the indexing engine identifies meaningful linguistic units. The indexing engine identifies the boundaries of each sentence (i.e., boundaries of sentences 200 and 205). The indexing engine also identifies the boundaries of noun phrases 210 and verb groups 215. Noun phrases match entities and verb groups match actions. The indexing engine may also identify regular and irregular morphological variants of words such as find vs. finds vs. found 220. In some embodiment, this is accomplished using a stemming algorithm. Stemming is the process for reducing inflected (or sometimes derived) words to their stem, base, or root form. The stem need not be identical to the morphological root of the word; it is usually sufficient that related words map to the same stem, even if this stem is not in itself a valid root. The indexing engine may also identify concepts (e.g. breast cancer), whether these are referred to by the standard name (e.g. breast cancer) or by a synonym (e.g. breast carcinoma, breast neoplasm etc.). In addition, the indexing engine may also identify broader classes, such as, e.g., people, companies, amounts, temporal expressions, etc.

In some embodiments, the indexing engine 100 includes one or more taxonomies of concepts that are used to index source documents. These concept taxonomies may include a variety of sub-concept taxonomies. For example, a concept taxonomy may include a "disease" sub-taxonomy, which may further include a "neurological disease" sub-taxonomy listing the preferred names of neurological diseases as well as any synonyms or irregular morphological variants of those preferred names. In some embodiments, each concept taxonomy and/or sub-concept taxonomy is associated with a unique concept identifier. When the indexing engine identifies a concept (or synonym for that concept) within a source document, the indexing engine records the position of the concept within the source document in the index. In some embodiments, a user may update and/or import a taxonomy or sub-taxonomy.

Querying engine 105 evaluates the constraints of a query 135 against the index 130. In some embodiments, the querying engine includes one or more taxonomies that may be used to evaluate a query. For example, the querying engine may expand a query to search for synonyms of a concept (or multiple concepts) of a query. That is, the taxonomy may be included as part of a query. In some embodiments, the constraints are provided to the querying engine via an API so that queries 135 can be run, for example, as part of scheduled automatic processes.

Figure 6A:
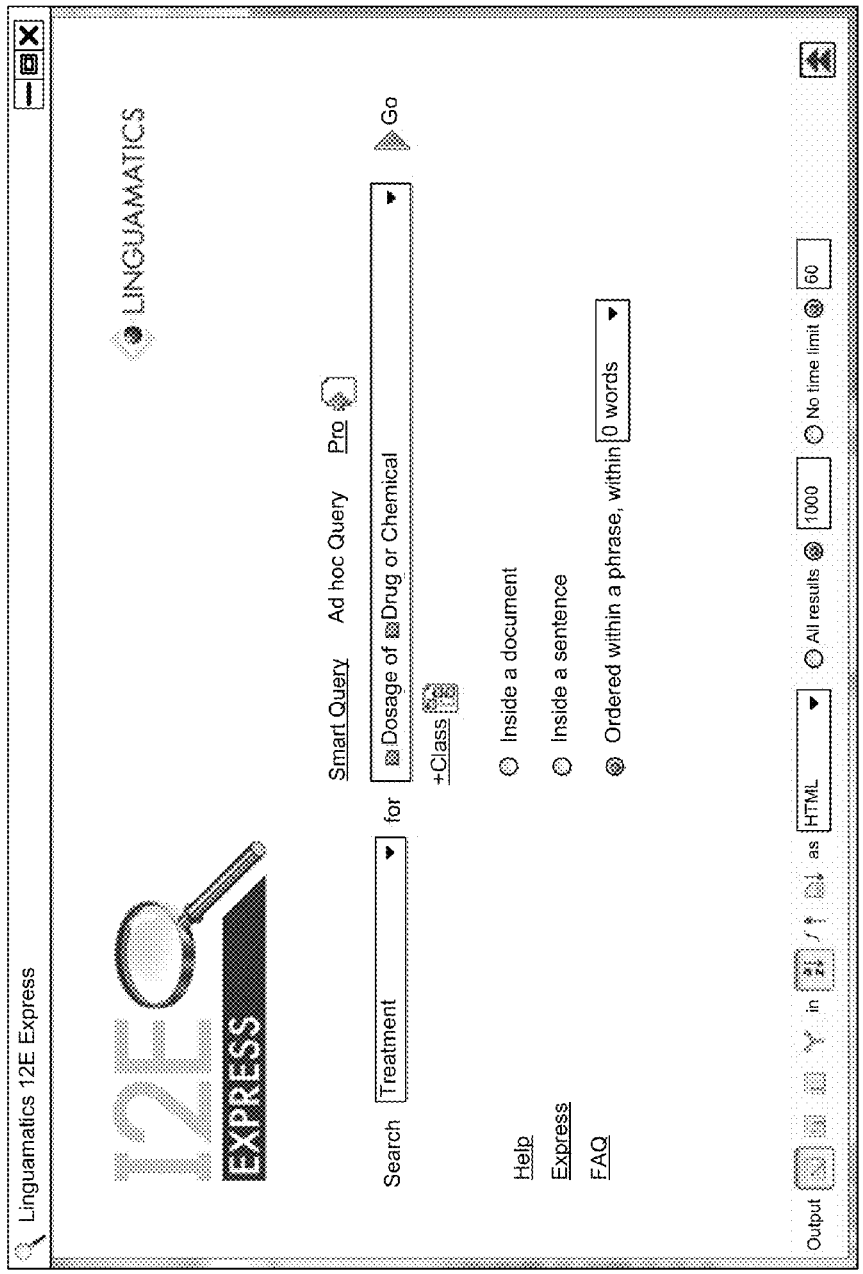
FIG. 6A is an example of a user interface for entering a search query.
Figure 6B:
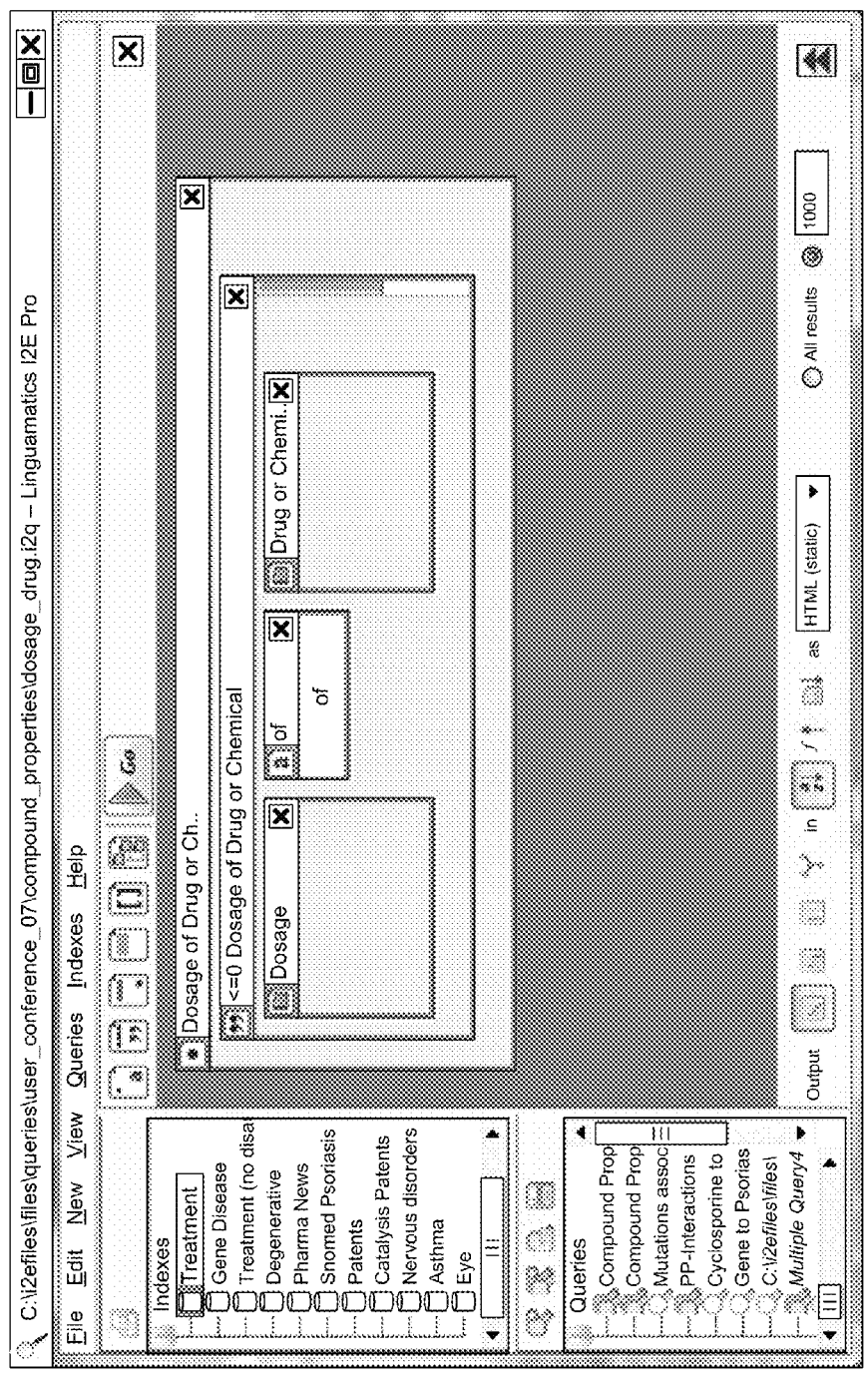
FIG. 6B is an example of a user interface for constructing a query using a graphical drag and drop interface.
Figure 6C:
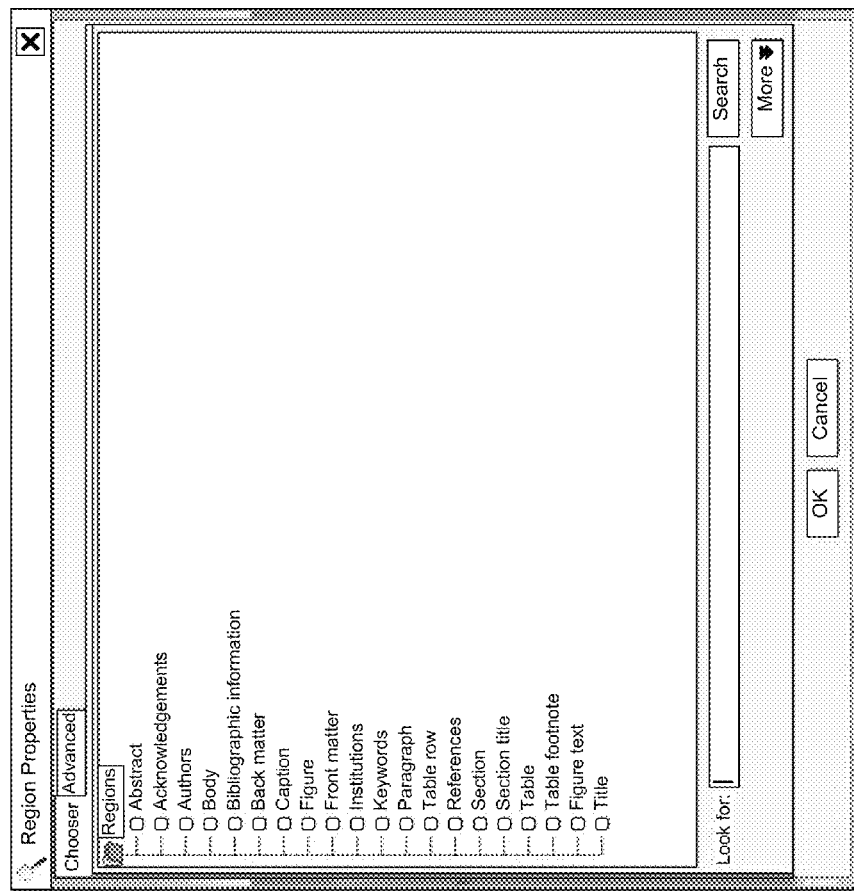
FIG. 6C is an example of a user interface for constructing a query over a region of a document.

In some embodiments, a query 135 is received by the querying engine 105 from a user. When querying the index, a user may impose a variety of constraints. The constraints of a query may include keywords, concepts, linguistic patterns, regions, etc. For example, the user may specify a query for a document containing a word in the title region, and having a particular concept (e.g., a neurological disease) in the description section of that document. That is, the querying engine allows a user to search the index to locate all instances of a particular region relevant to the user's query. In some embodiments, the user constraints are provided from a search-style text box (see, e.g., FIG. 6A), or from a graphical drag and drop interface (see, e.g., FIG. 6B). The user can pick all regions, an individual region, or multi-pick a set of regions to include in the search. Regions can also be organized in a hierarchy so that users can select a group of regions by selecting regions that are higher in the hierarchy. In some embodiments, a user can select a region of a document within which to search (see, e.g., FIG. 6C). The querying engine 105 may provide an interactive query interface that enables a user to refine a general query based on user-specified criteria (e.g., a selected region) and/or other metadata describing the index schema or taxonomies exposed to the user through the interactive query interface.

Output engine 110 analyzes and formats the results of the querying engine 105. The output engine may present the query results 140 in a variety of formats, including, but not limited to HTML, XLS (Excel format), XML, CSV (comma separated list), TSV (tab separated list), network graph languages (e.g., SIF, XGML), etc. FIG. 3A illustrates results for a query searching for different types of medical studies. Column 300 identifies the preferred names for the types of studies identified, which can be a synonym or morphological variant of a term in the text (e.g., "non-blind" vs. "non-blinding"). Column 305 identifies the number of documents in which the term was found. Column 310 shows an identifier for the identified documents, i.e., a unique identifier that is linked to the document. Column 315 provides the number of instances that the term appears within the document. Column 320 shows as evidence a segment of representative text where the study name occurs.

In some embodiments, the output engine 110 determines the format and/or the form of the results based on the constraints of the query. The output engine may include a variety of default output rules associated with particular types of queries. For example, the output engine may include a rule associated with class queries (e.g., types of medical studies) that indicates the form of the results will include a key column (e.g., "study type") having rows corresponding to the preferred class names (e.g., clinical, single-blind, etc.). As another example, the output engine may include a rule associated with linguistic pattern queries that orders columns according to the order of the query terms. In this example, the query "dosage" followed by the word "of" followed by "any drug or chemical" (see e.g., FIGS. 6A and 6B) would have the following default ordering of columns: "dosage" (first column) and "drug or chemical" (second column). In some embodiments, the default rules have an order of precedence. For example, a rule having a higher order of precedence may provide that columns corresponding to prepositions (e.g., "of") are not displayed.

In some embodiments, the output engine 110 determines the format and/or the form of the results based on display preferences specified by the user. The user's display preferences may be specified as part of a query and/or stored within a user profile. In some embodiments, the output engine includes an output editor that allows the user to manipulate how the results are displayed. For example, in the "dosage" example above, the user may manipulate the column order such that the "drug or chemical" column is listed first and the "dosage" column is listed second (see e.g., results shown in FIG. 4). The user may also specify display preferences after the query is executed to automatically change the format or form in which the results are displayed. For example, users can specify one or more regions to be displayed in the results.

Regions can be nested, and the system allows users to exploit this, for example, to look for the introduction of the conclusion.

In some embodiments, the output engine 110 provides a variety of controls that allow a user to change how the results are displayed. For example, the output engine may provide controls that allow the user to add or remove columns, order the results (e.g., by the document identifier, by the frequency of a term or terms within a document or region, alphabetically, etc.), etc.

In some embodiments, the output engine 110 enables the user to drill down within a particular result to examine the evidence for that result. As shown in FIGS. 3A and 3B, columns 305 and 315 include controls 330 and 335 represented by the arrows. The controls allow the user to open (or close) a row to show (or hide) the documents corresponding to a particular result (e.g., a study type such as single-blind). The controls of column 315 allow the user to open (or close) a row to show (or hide) the instances of the study type within a particular document. FIG. 3B illustrates the effect of expanding the single-blind row (i.e., row 325). When control 330 is activated, row 325 expands to show the documents corresponding to the single-blind study type. When control 335 is activated, row 325 expands to show the instances of the single-blind study type within the text of document 340. In some embodiments, the output engine ranks the results. For example, the document having the greatest number of instances of a term is listed first among documents that have the same terms. As shown in FIGS. 3A and 3B, document 340 has the greatest number of instances (i.e., 2) of the single-blind study type.

In some embodiments, when the output engine 110 clusters similar and/or identical results, the output engine determines whether all of the documents or only a selection of the documents will be presented to the user. For example, the output engine may delete duplicate documents or display only a selection of the documents when the cluster is based on non-key columns. In some embodiments, the output engine orders the results. For example, the results may be ordered alphabetically or according to frequency, with the results found in the most documents ordered first.

In some embodiments, the output engine 110 highlights text areas that are relevant to the query in the results of the query. For example, the column 320 in FIG. 3B includes highlighted terms and phrases that were included in or related to the search-query. The output engine may also provide hyperlinks to the documents identified by the particular query. For example, the document identifier such as identifier 340 may include a hyperlink to the document. In some embodiments, the hyperlinks are included in the relevant parts of the results so that a user can navigate to the position within a document where the displayed region is located.

In some embodiments, the output engine 110 groups the results. For example, the results may be grouped according to a preferred term, concept, string, or character position. By grouping results, relationships among terms of the query are identified for the user. FIG. 4 illustrates part of a table of results associated with a search for sentences containing "drugs" and "dosages" in one or more linguistic patterns. Column 400 shows as evidence a representative sentence in the text where a drug appears with a dosage in a linguistic pattern. Linguistic patterns include classes (e.g., drugs, dosages, companies, people, genes, proteins, etc.) in a particular structure within a sentence. This includes the classes being at a certain word distance, or in a syntactic or semantic relationship composed from linguistic units such as noun groups, verb groups or prepositions. As shown in FIG. 4, the results have been grouped according to the preferred names of the drugs, and particular dosages (i.e., columns 405 and 410 respectively).

In some embodiments, the output engine 110 can combine one or more queries. For example, the output engine may add queries; subtract queries; determine the intersection, union, or difference of queries; and/or join queries. FIG. 5 illustrates the joining of two queries (formatted with the option of displaying the evidence to the right). In this example, a first query looks for a relationship between the drug cyclosporine and any gene. The search is for the concept cyclosporine which includes the synonym CsA (as shown in row 500 of the results). A second query looks for the relationship between any gene and psoriasis. By joining the first query and the second query, the results provide a list of potential gene intermediaries and hence a hypothesis for the connection between cyclosporine and psoriasis. That is, the joined results provide evidence of an indirect relationship between cyclosporine and the disease psoriasis The system's uniform treatment of linguistic units (e.g., sentences, noun groups, and verb groups), structural units (e.g., paragraphs, sections, and titles), and metadata (e.g. publication year or list of authors) allows users considerable freedom to formulate queries and receive results that are both relevant and easy to process. For example, users can search for words or concepts within specific regions. FIG. 7 illustrates a query over a combination of structured and semi-structured data. In this example, the patent numbers (column 700) and the publication dates (column 705) were extracted from the metadata (semi-structured text) of the documents, and the amounts (column 710) and drugs (column 715) were extracted from the unstructured text of the documents.

Those skilled in the art will appreciate that various architectural changes to the system may be made while still providing similar or identical functionality. For example, the system may be implemented in a variety of environments including a single, monolithic computer system having a computer-readable medium, a distributed system having a computer-readable medium, as well as various other combinations of computer systems or similar devices connected in various ways. Moreover, those skilled in the art will further appreciate that the actions of the system described in FIG. 1 may be altered in a variety of ways. For example, the order of the actions may be rearranged, certain actions may be performed in parallel, actions may be omitted, or other actions may be included.

We claim:

1. A non-transitory computer-readable storage device comprising instructions that, when executed by a computer system, cause the computer system to:
   receive a query that includes at least one linguistic constraint and an indication of at least one region;
   cause a data structure to be searched, based on the received query;
   identify, within the data structure, at least one semi-structured document for which the at least one linguistic constraint is satisfied within the at least one region,
      wherein the data structure identifies linguistic units identified for the at least one semi-structured document,
         wherein the identified linguistic units include grammatical units within a sentence,
         wherein the grammatical units include a noun phrase, a verb group, or both a noun phrase and a verb group,
         wherein the noun phrase comprises at least one noun and any modifier of the at least one noun, and wherein the verb group comprises at least one verb; and format results of the query by clustering together similar results, whether from the at least one semi-structured document or from multiple semi-structured documents.

2. The non-transitory computer-readable storage device of claim 1, wherein the results are further formatted based on a plurality of rules having an order of precedence.

3. The non-transitory computer-readable storage device of claim 1, further comprising instructions that, when executed by the computer system, cause the computer system to display the results to a user.

4. The non-transitory computer-readable storage device of claim 3, wherein the results are displayed in a format selected from the group consisting of: HTML, XLS, XML, CSV, and TSV.

5. The non-transitory computer-readable storage device of claim 3, further comprising instructions that, when executed by the computer system, cause the computer system to provide one or more controls that enable the user to manipulate the displayed results.

6. A method, comprising:
receiving a query that includes at least one linguistic constraint and an indication of at least one region;
causing a data structure to be searched, based on the received query;
identifying, within the data structure, at least one semi-structured document for which the at least one linguistic constraint is satisfied within the at least one region,
wherein the data structure identifies linguistic units identified for the at least one semi-structured document,
wherein the identified linguistic units include grammatical units within a sentence,
wherein the grammatical units include a noun phrase, a verb group, or both a noun phrase and a verb group,
wherein the noun phrase comprises at least one noun and any modifier of the at least one noun, and
wherein the verb group comprises at least one verb; and
formatting results of the query by clustering together similar results, whether from the at least one semi-structured document or from multiple semi-structured documents.

7. The method of claim 6, wherein the results are further formatted based on a plurality of rules having an order of precedence.

8. The method of claim 6, further comprising instructions that, when executed by the computer system, cause the computer system to display the results to a user.

9. The method of claim 8, wherein the results are displayed in a format selected from the group consisting of: HTML, XLS, XML, CSV, and TSV.

10. The method of claim 8, further comprising instructions that, when executed by the computer system, cause the computer system to provide one or more controls that enable the user to manipulate the displayed results.

11. A non-transitory computer-readable storage device comprising instructions that, when executed by a computer system, cause the computer system to:
receive a query that includes at least one linguistic constraint and an indication of at least one region;
initiate search of a data structure based on the received query;
identify, within a data structure, at least one semi-structured document for which the at least one linguistic constraint is satisfied within the at least one region,
wherein the data structure identifies linguistic units identified for the at least one semi-structured document,
wherein the identified linguistic units include grammatical units within a sentence,
wherein the grammatical units include a noun phrase, a verb group, or both a noun phrase and a verb group,
wherein the noun phrase comprises at least one noun and any modifier of the at least one noun, and
wherein the verb group comprises at least one verb; and
format results of the query.

12. The non-transitory computer-readable storage device of claim 11, wherein the results are further formatted based on a plurality of rules having an order of precedence.

13. The non-transitory computer-readable storage device of claim 11, further comprising instructions that, when executed by the computer system, cause the computer system to display the results to a user.

14. The non-transitory computer-readable storage device of claim 13, wherein the results are displayed in a format selected from the group consisting of: HTML, XLS, XML, CSV, and TSV.

15. The non-transitory computer-readable storage device of claim 13, further comprising instructions that, when executed by the computer system, cause the computer system to provide one or more controls that enable the user to manipulate the displayed results.

16. A method, comprising:
receiving a query that includes at least one linguistic constraint and an indication of at least one region;
causing searching of a data structure to be performed, based on the received query;
identifying, within the data structure, at least one semi-structured document for which the at least one linguistic constraint is satisfied within the at least one region,
wherein the data structure identifies linguistic units identified for the at least one semi-structured document,
wherein the identified linguistic units include grammatical units within a sentence,
wherein the grammatical units include a noun phrase, a verb group, or both a noun phrase and a verb group,
wherein the noun phrase comprises at least one noun and any modifier of the at least one noun, and
wherein the verb group comprises at least one verb; and
displaying the results of the query.

17. The method of claim 16, further comprising clustering together similar results, whether from the at least one semi-structured document or from multiple semi-structured documents.

18. The method of claim 17, wherein the semi-structured document is selected from the group consisting of: HTML, XLS, XML, CSV, and TSV.

19. A method, comprising:
receiving a query that includes at least one linguistic constraint and an indication of at least one region;
searching a data structure based on the received query;
identifying, within the data structure, at least one unstructured document for which the at least one linguistic constraint is satisfied within the at least one region,
wherein the data structure identifies linguistic units identified for the at least one unstructured document, wherein the identified linguistic units include grammatical units within a sentence,
wherein the grammatical units include a noun phrase, a verb group, or both a noun phrase and a verb group,
wherein the noun phrase comprises at least one noun and any modifier of the at least one noun, and
wherein the verb group comprises at least one verb; and
displaying the results of the query.

20. The method of claim 19, further comprising analyzing the at least one unstructured document to discover the at least one region.

21. The method of claim 20, further comprising clustering together similar results, whether from the at least one unstructured document or from multiple unstructured documents.

22. The method of claim 19, further comprising clustering together similar results, whether from the at least one unstructured document and from a semi-structured document.

23. A method comprising:
storing data in an index based on one or more identified linguistic units identified for each of multiple, different documents,
wherein at least some of the documents comprise unstructured text,
wherein the storing includes storing in the index multiple linguistic units identified in the unstructured text,
wherein the identified linguistic units include grammatical units within a sentence,
wherein the grammatical units include a noun phrase, a verb group, or both a noun phrase and a verb group,
wherein the noun phrase comprises at least one noun and any modifier of the at least one noun, and
wherein the verb group comprises at least one verb; and,
in response to receiving a query comprising a linguistic pattern,
querying the index based on one or more constraints of the linguistic pattern; and
formatting results of the query by:
clustering together similar results from a same document in the multiple, different documents; and
clustering together similar results from at least two different documents in the multiple, different documents.

24. The method of claim 23 wherein the formatting is based on the linguistic pattern.

25. The method of claim 23 wherein the formatting is based on a plurality of rules having an order of precedence.

26. The method of claim 23 further comprising displaying the results to a user.

27. The method of claim 26 wherein the results are displayed in a format selected from the group consisting of: HTML, XLS, XML, CSV, and TSV.

28. The method of claim 26 further comprising providing one or more controls that enable the user to manipulate the displayed results.

29. The method of claim 28 wherein the one or more controls include an expand control to expand the displayed results.

30. The method of claim 26 wherein the results are displayed in alphabetical order.

31. The method of claim 26 wherein the results are displayed according to frequency order.

32. The method of claim 23 further comprising, in response to receiving a subsequent request to join the results to another linguistic pattern; and
querying the index based on one or more constraints of the other linguistic pattern; and
joining the results to results of the other linguistic pattern query.

33. A non-transitory computer-readable storage device storing instructions, which when executed by at least on data processing device, perform a method comprising:
storing data in an index based on one or more identified linguistic units identified for each of multiple, different documents,
wherein at least some of the documents comprise unstructured text,
wherein the storing includes storing in the index multiple linguistic units identified in the unstructured text,
wherein the identified linguistic units include grammatical units within a sentence,
wherein the grammatical units include a noun phrase, a verb group, or both a noun phrase and a verb group,
wherein the noun phrase comprises at least one noun and any modifier of the at least one noun, and
wherein the verb group comprises at least one verb; and,
in response to receiving a query comprising a linguistic pattern,
querying the index based on one or more constraints of the linguistic pattern; and
formatting results of the query by:
clustering together similar results from a same document in the multiple, different documents; and
clustering together similar results from at least two different documents in the multiple, different documents.

34. The non-transitory computer-readable storage device of claim 33 wherein the formatting is based on the linguistic pattern.

35. The non-transitory computer-readable storage device of claim 33 wherein the formatting is based on a plurality of rules having an order of precedence.

36. The non-transitory computer-readable storage device of claim 33 further comprising displaying the results to a user.

37. The non-transitory computer-readable storage device of claim 36 wherein the results are displayed in a format selected from the group consisting of: HTML, XLS, XML, CSV, and TSV.

38. The non-transitory computer-readable storage device of claim 36 further comprising providing one or more controls that enable the user to manipulate the displayed results.

39. The non-transitory computer-readable storage device of claim 38 wherein the one or more controls include an expand control to expand the displayed results.

40. The non-transitory computer-readable storage device of claim 36 wherein the results are displayed in alphabetical order.

41. The non-transitory computer-readable storage device of claim 36 wherein the results are displayed according to frequency order.

42. The non-transitory computer-readable storage device of claim 33 further comprising, in response to receiving a subsequent request to join the results to another linguistic pattern; and
querying the index based on one or more constraints of the other linguistic pattern; and
joining the results to results of the other linguistic pattern query.

* * * * *

UNITED STATES PATENT AND TRADEMARK OFFICE
CERTIFICATE OF CORRECTION

PATENT NO. : 9,031,926 B2  
APPLICATION NO. : 13/414372  
DATED : May 12, 2015  
INVENTOR(S) : David R. Milward et al.

It is certified that error appears in the above-identified patent and that said Letters Patent is hereby corrected as shown below:

In the drawings,

On sheet 5 of 10, in Figure 4, line 22, delete "primecrolimus" and insert -- pimecrolimus --, therefor.

On sheet 6 of 10, in Figure 5, line 3, delete "ciclosporin" and insert -- cyclosporin --, therefor.

In the specification,

In column 6, line 19, delete "psoriasis" and insert -- proriasis. --, therefor.

Signed and Sealed this
Thirteenth Day of October, 2015

Michelle K. Lee
*Director of the United States Patent and Trademark Office*